United States Patent [19]

Schumann et al.

[11] Patent Number: 6,078,328
[45] Date of Patent: Jun. 20, 2000

[54] COMPRESSED VIDEO GRAPHICS SYSTEM AND METHODOLOGY

[75] Inventors: Robert W. Schumann, Oakton; Michael Bergeron, Glen Allen; Jo Janet Mikula, Manquin; Jack Ehrhardt, Richmond; Mark O. Harrison, Sr., Mechanicsville, all of Va.

[73] Assignee: Digital Video Express, LP, Herndon, Va.

[21] Appl. No.: 09/092,897

[22] Filed: Jun. 8, 1998

[51] Int. Cl.⁷ ........................................ G06F 15/00
[52] U.S. Cl. .............................................. 345/418
[58] Field of Search ................... 345/418, 473; 434/185, 169, 167, 172

[56] References Cited

U.S. PATENT DOCUMENTS

| | | | |
|---|---|---|---|
| 4,825,301 | 4/1989 | Pape et al. | 348/420 |
| 4,868,570 | 9/1989 | Boliek et al. | 341/106 |
| 5,408,328 | 4/1995 | Boliek et al. | 358/433 |
| 5,493,638 | 2/1996 | Hooper et al. | 345/435 |
| 5,680,161 | 10/1997 | Lehman et al. | 345/190 |
| 5,684,539 | 11/1997 | Boyce et al. | 348/420 |

*Primary Examiner*—Phu K. Nguyen
*Attorney, Agent, or Firm*—McDermott, Will & Emery; Paul Devinsky

[57] ABSTRACT

Graphics in the same compressed digital format as that of a target video image are combined, on the fly, by an application. Combination is performed by frame modification or overlay techniques. In the preferred embodiment, the compressed video image format conforms to an MPEG-2 compression standard. A base image is produced by an I-frame, and MPEG-2 graphics elements formed either by modifying the I-frame or overlaying the I-frame with one or more P-frames.

17 Claims, 7 Drawing Sheets

(Background Art)

FIG. 1

(Background Art)

COMPRESSED VIDEO GRAPHICS SYSTEM AND METHODOLOGY

TECHNICAL FIELD

This invention relates generally to image processing, and more particularly, to video graphics produced within a compressed digital domain, such as MPEG-2.

BACKGROUND ART

Using image and video compression technology, still images and motion pictures can be recorded using only a fraction of the storage required for the uncompressed video or images. A DVD, for example, is capable of holding 4.7 gigabytes of data on each layer, enough information typically for a 133 minute movie on each layer. This medium uses the MPEG-2 data compression standard that enables video programming to be efficiently stored and reproduced without significant visible degradation. The MPEG-2 compression algorithms, produced by the Motion Picture Experts Group, are described in ISO/TEC 11172 (MPEG-1) and ISO/TEC 13818 (MPEG-2), incorporated herein by reference.

MPEG-2 provides for video frames to be encoded into a series of macroblocks, with each macroblock corresponding to a different spatial portion (a 16×16 array of pixels) of a video image. Each macroblock includes a plurality of luminance blocks, e.g., four luminance blocks and a plurality of chrominance blocks, with each encoded block using a discrete cosine transform encoding operation. For example, a so-called 4:2:2 macroblock structure is one in which four luminance blocks and four chrominance blocks are represented.

The MPEG-2 standard defines three types of picture frames: intra, predicted and bi-directional. Intra frames, or I-frames, are coded using only information present in the picture itself. They form a reference or base frame for a series of pictures. Predicted frames, or P-frames, are coded with respect to the nearest previous I- or P-frame. P-frames use motion compensation to provide compression because only changes to the frame, and not the static background, is coded. P-frames contain both intra-macroblocks, that use only self-contained information and inter-macroblocks that use information based on predicted changes to the image. Bi-directional frames, or B-frames, use both past and a future frame as a reference. A scene having a stationary background with an object moving across it will be coded as a single I-frame representing the static background (base image), together with P- and B-frames depending on the amount of compression desired, representing the object in motion.

Interactive multimedia environments require display of both dynamic computer-generated graphics and video streams. One example is in prerecorded media, such as DVDs, where an application will generate graphic images to facilitate user interaction.

Pixel-based graphics is predicated on bit mapped images in which a graphic display is produced on a screen by reading the contents of a screen memory in which bits are stored at memory addresses corresponding to pixel screen locations. The format of pixel-based graphics is system dependent. Graphics designed for an environment having a particular specification may not be operated compatibly in a different environment.

Figure 1:
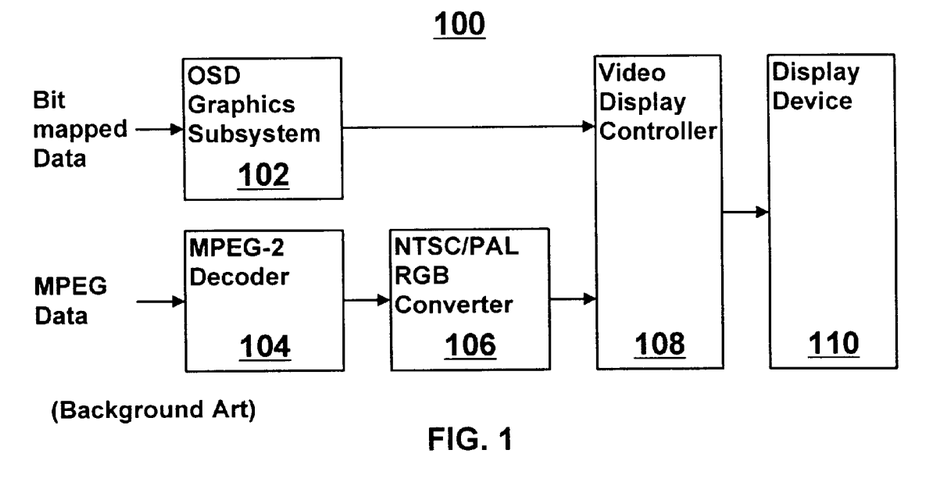
FIG. 1 is a drawing depicting conventional technology for a multimedia device that can display both motion video and graphics elements.

FIG. 1 shows a typical arrangement 100 combining traditional pixel-based computer graphics with MPEG-2 based video, enabling display of both graphics and video streams. On-screen display (OSD) graphics subsystem 102 and video display controller 108 represent components of a conventional multimedia system. The OSD 102 is responsible for creating pixel-based graphics, such as button and text that may be part of a menu display. Each pixel is represented by a pattern of bits that define the color of the pixel. MPEG-2 decoder 104 converts compressed MPEG-2 data into images appropriate for viewing on a display, such as a television screen, and converter 106 converts the television ready data into an equivalent bit representation. The controller 108 creates the proper video signals, timing of image display and overlay of bit mapped data over the MPEG-2 images, and sends the output signal to the display 110.

This conventional technology, although effective for the purpose intended, combines video image decompression and computer graphics generation, which inherently are disparate technologies. Both OSD and -2 specific hardware and software are utilized, and consequently there is little sharing of resources or functionality.

Furthermore, the need to enable a user to play back material from different, possibly incompatible, playback units is hampered by pixel-based graphics. For example, a unit having a display based on 4-color graphics cannot faithfully reproduce the content of a pixel-based signal encoded in 256-color graphics. The MPEG-2 standard, on the other hand is universal and independent of other specifications of the playback unit. The invention advantageously eliminates the need for pixel-based graphics, and hence not only reduces hardware and software overhead, but maintains conformance with MPEG-2 standards. The invention additionally permits integration of graphics with video, locally and on the fly by the user of an interactive video system, subsequent to, but not limited to many attributes of, the authoring process. The invention still further enables graphics creation and display to be carried out by playback units of limited processing capabilities.

Although the best mode of the invention is described in the environment of an MPEG-2 standard, it is to be understood that the invention is applicable to other image and video compression standards, such as, but not limited to, MPEG-1, MPEG-4, JPEG, JPEG motion, any DCT based arrangement, MOV, AVI, wavelet, FLI and Adobe Flik.

DISCLOSURE OF THE INVENTION

The invention enables graphic elements to be built, on the fly, by an application that builds them for display at a user station that decodes compressed image and video streams. The invention builds these dynamic graphics elements utilizing pre-compressed building blocks in the same compressed digital format as the format of the target video, and hence shares local hardware and software available for video decoding. The invention performs the functions of storing a plurality of graphics elements produced by a graphics signal coded in a compressed video signal format; obtaining an original video image formed by a video signal coded in a compressed video signal format the same as, or functionally compatible with, the compressed video signal format in which the graphics elements are coded; selecting one or more graphics elements from among the plurality of graphics elements; combining the original video image and the selected graphics elements coded in the compressed video signal format to produce a combined original video and selected graphics elements signal in the compressed video signal format; and decoding the combined original video and selected graphics element signal. In the preferred embodiment, the compressed video signal format conforms to the MPEG-2 standard.

In accord with one aspect of the invention, graphics are combined with the video image by image replacement. This is performed, in the example of MPEG, by editing an MPEG-2 image, and replacing a portion of the image with data representing an MPEG-2 graphic. In one example, the invention is carried out by initially supplying a base image comprising a stored MPEG-2 I-frame to a display; receiving character data from an input unit controlled by a user or from a program; selecting pre-compressed graphics representing the character data; modifying the MPEG-2 I-frame to insert macroblocks comprising the user graphics at a prescribed character position on the image; and supplying the modified MPEG-2 I-frame to a display.

As another aspect of the invention, graphics elements are combined with the base image by image overlay. This is performed, in the MPEG-2 example, displaying a base image comprising an MPEG-2 I-frame; and overlaying the original base image with one or more update images, displayed via at least one MPEG-2 P-frame. Within the P-frame, non-changed areas, such as areas overlying the original image not covered by the graphics elements, are encoded using transparency macroblocks, while the changed areas are encoded using intra-coded macroblocks.

A further understanding of the nature and advantages of the invention herein may be realized by reference to the remaining portions of the specification and drawings.

BEST MODE FOR CARRYING OUT THE INVENTION

Figure 2:
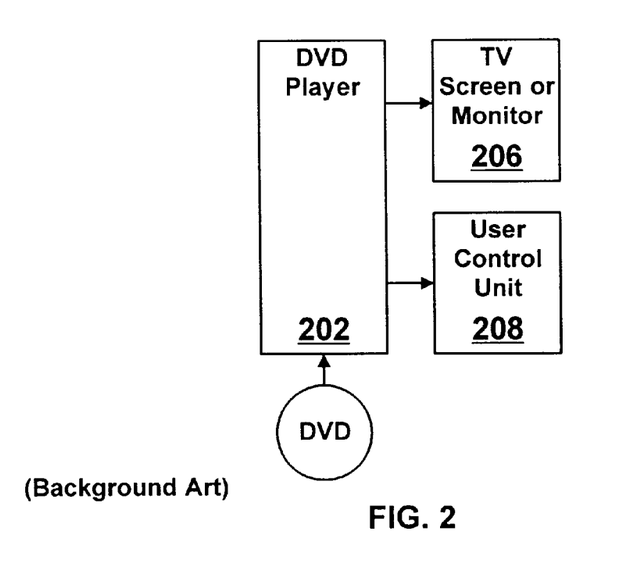
FIG. 2 is a high level system diagram depicting the operating environment of the invention.

In FIG. 2, a DVD player 202 receives an audio/video stream, applications and data from a DVD, typically coded in the MPEG-2 standard, and displays still images and full motion video on a television screen or monitor 206. The DVD player executes application software contained internally and read from the DVD. The player 202 also receives user commands from a remote control unit 208, from which a user may respond to menu items, displayed by the application on the screen via MPEG-2 graphics per the invention, for selection.

Figure 3:
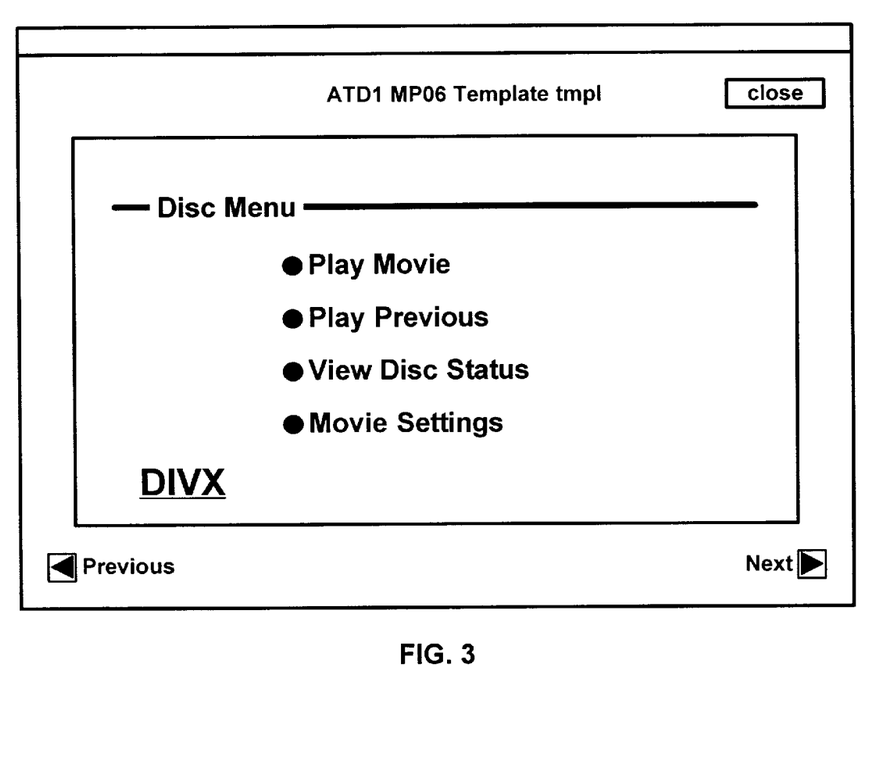
FIG. 3 is a sample template with a background image and four overlay images depicting buttons.

In FIG. 3, an exemplary screen is shown in the form of a template, with a static background or base frame displaying the words "DISCMENU," together with ornamental line and logo DIVX. Overlaid on the image is a series of frames depicting four buttons with corresponding descriptive labels. Using control unit 208, the user will index a cursor, created via MPEG-2 graphics per the invention, to the button designating a function desired to be executed. When the button is "pressed," by the user operating an ENTER function on the remote control unit, the button is highlighted, using MPEG-2 graphics, per the invention, to show that it has been selected, and the DVD player is controlled accordingly.

Significantly, the set top box 202 contains, in addition to other functionality, circuitry and software for processing and decoding video image data in a compressed format. Most typical in this application is MPEG, for decoding an MPEG-2 compressed video stream broadcast from a commercial source or from local storage, such as DVD player 204. Whereas conventional "on the fly" graphics has been pixel-based, as explained previously, this invention uniquely implements MPEG-2 graphics, produced and selected at the end user station, rather than point of authoring, and decoded using conventional set top box MPEG-2 decoder and associated processing circuitry. This is carried out by implementing an MPEG-2 I-frame as a base image, to which is added, at the end user station, one or more temporary MPEG-2 P-frames containing one or more graphical elements. These graphical elements may comprise functional icons, such as buttons as shown in FIG. 3, together with blocks of text or individual letters selected by the user through the user control unit 208.

Figure 4:
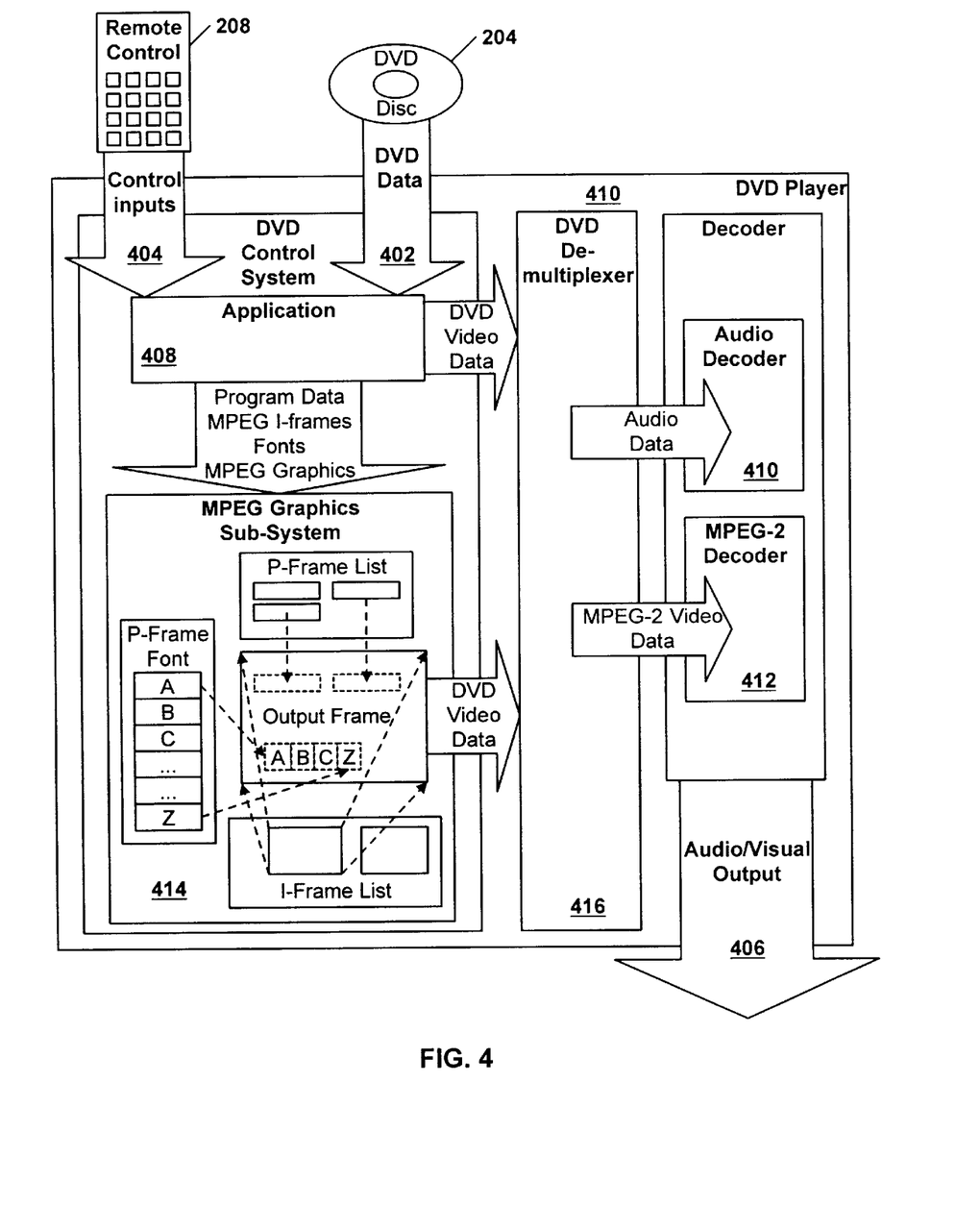
FIG. 4 is a functional diagram showing MPEG-2 data flow, in accord with the invention.

Referring to FIG. 4, within set top box 204 is a hardware system having a first input port 402 for receiving data from a DVD, in the preferred embodiment, a second port 404 for receiving control inputs produced by user control unit 208 and an output port 406 for supplying an audio/video output signal, fully MPEG-2 decoded, to the user's television or monitor. Raw DVD data that includes various kinds of data in addition to DVD video, reproduced from disk 204, is supplied through input port 402 to an application system 408 that executes both disk applications and local applications. The DVD video data, developed from disk 204, is supplied to a DVD decoder 410, and motion video is applied to MPEG-2 decoder 412 and associated audio supplied to an audio decoder, in a conventional manner. The outputs of audio and MPEG-2 decoders 410 and 412 supply the audio/video signals to audio signal processing circuitry in the television. The television thus reproduces the full motion video and audio content of the disk, faithfully.

However, control inputs at port 404 are supplied to an application sub-system 408, together with program data derived in part from disk 204 and base images and graphics elements derived in part from disk 204. The application sub-system 408 in turn communicates with an MPEG-2 graphics sub-system 414 that includes a memory for storing graphics images, encoded in MPEG-2 macroblocks, representing buttons, fixed text and font characters provided by the application sub-system. Also stored in the memory of MPEG-2 sub-system 414 is a list of font macroblocks representing individual letters that can be accessed by operation of the user control unit 208. Fonts can reside in ROM or be added dynamically by the application. The base images are stored in an I-frame list and are provided, and selectively activated, under application control. The application and MPEG-2 sub-systems may be platformed on an SGS-Thomson ST-20-C4 microprocessor, for example.

Initially, an I-frame, representing background, is provided to the output frame structure to be sent by MPEG-2 sub-system 414, through a demultiplexer 416. to MPEG-2 decoder 412. This decoder 412 may be, for example, an SGS-Thomson ST3520A MPEG-2 decoder. The decoded background frame typically represents the static background image displayed on the screen. In response to control inputs produced by user control unit 208, the application sub-system 408 may be, in this example, instructed to "press" a button. This function is performed by delivering one or more graphical elements to MPEG-2 sub-system 414, followed by a command to update the display. Sub-system 414 places the elements in the P-frame list. The display function is performed by building a P-frame, dynamically at the end user station, into the output frame from the P-frame list that contains graphics elements containing the pre-compressed macroblocks. For example, the constructed P-frame may present a visual display of the button actually being pressed on the screen.

In order to facilitate display within a DVD player (as, or incorporated in, the set-top box), the resultant I-frame data and P-frame data are wrapped within a DVD structure, in the form of 2K sectors of data bounded by headers conforming to the DVD specification.

Figure 9:
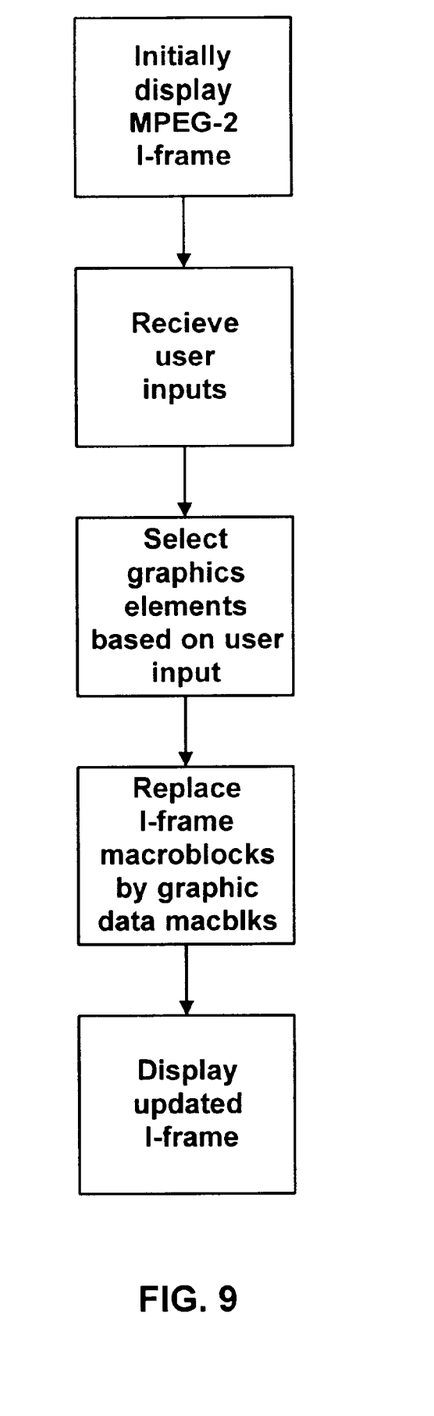
FIG. 9 is a flowchart describing adding a graphic by image replacement, in accord with one aspect of the invention.

Macroblocks, representing buttons and font characters and other graphics elements, may be copied to the output frame based on the requirements of the program data produced internally by the set top box. The output frame is dynamically constructed and sent to DVD decoder 412 each time data has changed, or, optionally, under application control, to refresh the displayed input. The output frame is continually updated in this manner based on needs of the program data and control inputs, until program logic requires a new base image (I-frame). Thus, new output frames are dynamically constructed and displayed based on the needs of the program data and control inputs. The audio/video output 406 represents DVD/MPEG-2 decoded video and graphics to be displayed on the television screen or computer monitor A graphics element can be added to a background image either by image replacement or image overlay, in accord with aspects of this invention. Referring to FIG. 9, image replacement consists of editing an existing MPEG-2 image (I-frame) and replacing a portion of the data with the data representing a graphic. In preferred form, each graphic represents a region or macroblock boundary that typically is some small area of the image. Before the graphic can be inserted into the image, the graphic must be modified, and the final position of the graphic placed in the macroblock headers. After modifying the graphics position, the I-frame data, starting at the position desired, is replaced by the updated graphic data.

Thus, in this example, an MPEG-2 base image (I-frame) initially is displayed. Command inputs in the form of characters and movement arrows provided by the user are received, and the application selects the appropriate MPEG-2 graphic. The MPEG-2 graphics elements then are modified to insert this data at the appropriate character position. Finally, the background data is replaced with the graphic, and the modified image passed to the decoder for display.

In addition, the application may display a cursor by performing periodic updates to implement a blinking cursor image, when the user is idle. This cursor, implemented using MPEG graphics per the invention, can take various forms, where each individual representation is stored as a unique set of graphic images.

Figure 10:
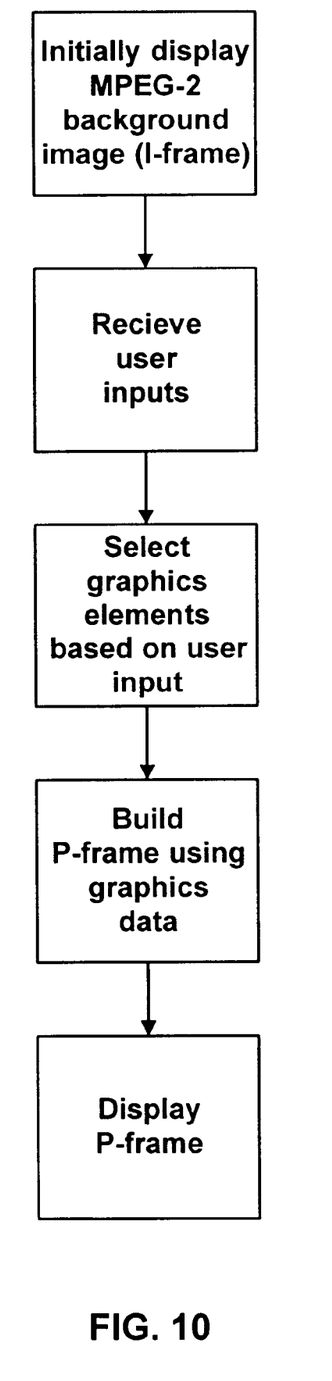
FIG. 10 is a flowchart describing adding a graphic by image overlay, in accord with another aspect of the invention.

Image overlay, shown in FIG. 10, uses a slightly different mechanism to display graphics on an image. Whereas the image replacement algorithm, described previously, modifies the base image, image overlay creates a new image, and that new image is overlaid on the original using the P-frame construction and display mechanism.

Referring to FIG. 10, the graphics element to be added to the overlay image consists of MPEG-2 data, and its position on the image must be modified as described in FIG. 9 for image replacement. Thus, the base image initially is displayed in the form of an I-frame, user inputs denoting the graphic are received, and the graphic data modified to incorporate image position, then inserted into the P-frame under construction. However, areas of the overlay image that do not contain any graphics must also be coded. These areas must be transparent to enable the underlying image to be viewed. Hence, portions of the overlay that cover an underlying image that is to be viewed are coded using a transparency graphic, containing MPEG-2 code instructing the decoder to ignore the data. To build an overlay image, the graphic is added in the appropriate position and transparency graphics added to areas of the image not covered by the graphic. The overlay image then is sent to the MPEG-2 decoder for display, and the P-frame overlay image will be overlaid on the last image displayed. Any number of graphics elements can be overlaid in this fashion.

An example of an image overlay is a text editor. Each time the user presses a key, an overlay image is created containing the graphic for the selected character. Each successive key press will produce a new image, containing appropriate transparency, so that characters previously entered, and the cursor, will remain visible on the display.

One advantage of image overlay over image replacement is that the overlay is created and displayed only once. The unchanged portions of the overlay image do not have to be stored. This requires utilization of a smaller buffer, in contrast to replacement where an entire I-frame is stored and sent to the output frame for decoding.

Figure 5:
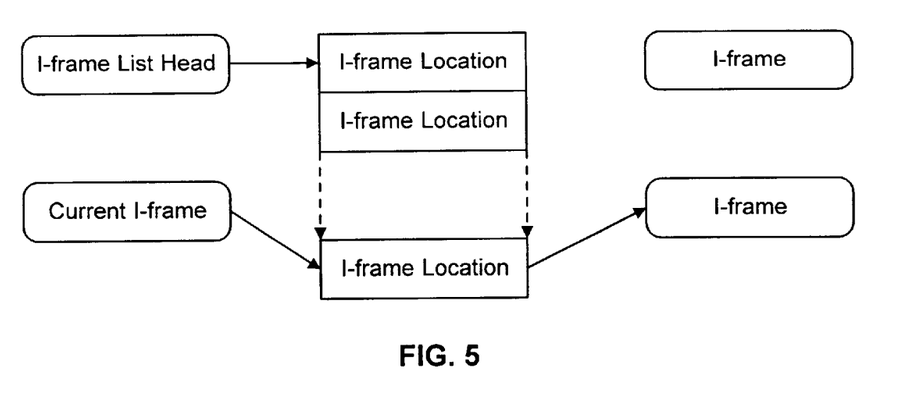
FIG. 5 is a diagram showing I-frame list management, in accord with an aspect of the invention.
Figure 6:
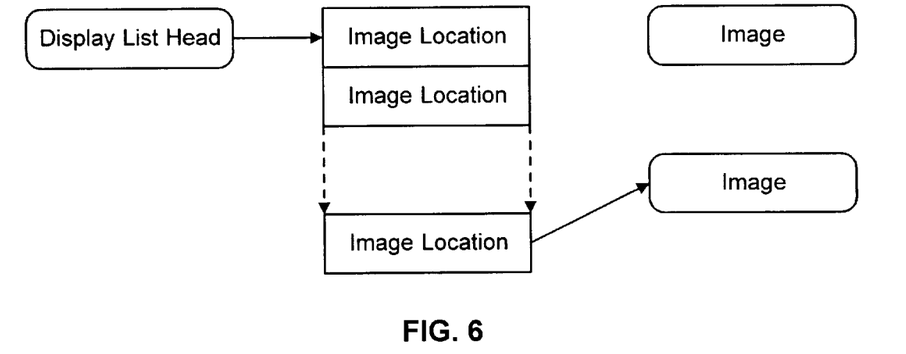
FIG. 6 shows display list management for graphics elements.

The preferred embodiment of a mechanism for implementing MPEG-2 graphics is as follows. The I-frame list comprises background images represented by fully pre-encoded intra-coded I-frames. For any given display screen, the I-frame typically contains all static images, including borders and shading, to identify dynamic text display areas and immutable text. One or more I-frames may be resident in system memory at any time, available for display. Graphics management maintains a list of the frames available for display, adding to the list of available frames by receiving new frames from the application, that may be retrieved from secondary storage, such as the DVD. Under application control, a graphics manager may remove unneeded frames from the list, and reclaim memory previously allocated to them. The manager maintains the memory address of the frame most recently selected for display. Frames are identified by alphanumeric strings, used as a key for the selection of frames. FIG. 5 shows a frame management structure, with a series of I-frame locations headed by a list head, and pointing to I-frame locations in memory.

The graphics elements consist of small sub-screen display items such as buttons, icons and textual symbols, as mentioned previously. These graphics elements are delivered to the graphics manager as a group of adjacent macroblocks, fully encoded except for their macroblock address increment fields that are pre-encoded with a default value, adjusted at run-time. Each graphics item contains data describing the position of representative macroblocks as well as the actual macroblocks containing the image. In the preferred form, a graphics element is a rectangular image of neighboring macroblocks, and the associated data define the height, width and slice size in macroblocks. At presentation time, the foreground images, selected by the application for display, are collected and used to encode a complete MPEG-2 P-frame, that is then submitted to the decoder for display. At any time, any number of graphics elements may be resident in system memory, and available for display. Graphics management maintains a list of these images, to which may be added or removed, via application control, a list of available images by retrieval from the DVD or other secondary storage.

Figure 7:
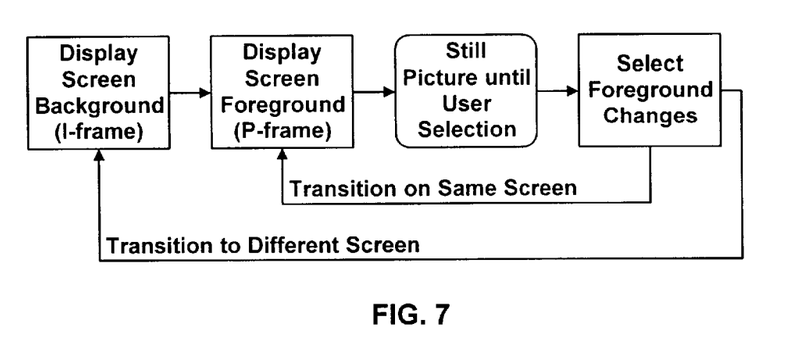
FIG. 7 is a diagram showing graphics processing from the perspective of a calling application per the invention.

FIG. 7 depicts the general flow of graphics processing from the perspective of a calling application. The display screen initially displays a background image, created by displaying an I-frame. Overlaid on the base image is a P-frame representing a first image, that may be a highlighted button, for example, on the base image. The picture remains still until the user enters a selection, such as an activation, or "pressing" of a button display. A graphics change thus is selected and an additional, corresponding, P-frame is created. This process is completed for each graphics element to be displayed. For example, four buttons may be represented by four (or fewer) P-frames, each depicting one or more buttons.

Figure 8:
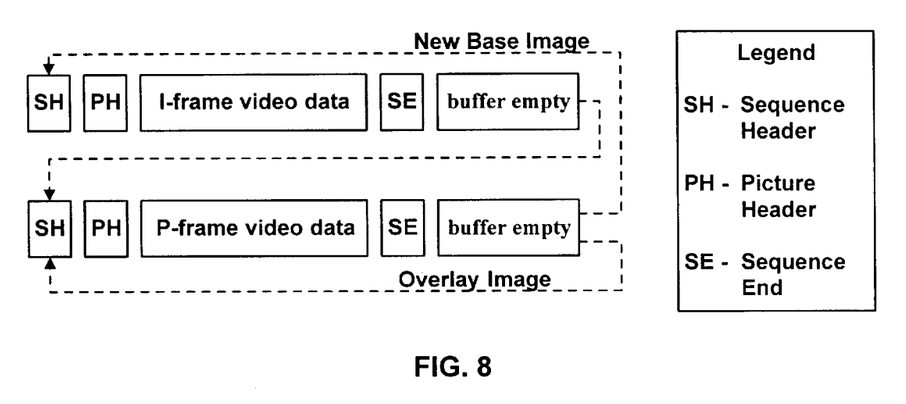
FIG. 8 depicts an MPEG-2 data stream, in accord with the invention, with identification of major stream components.

In FIG. 8, the corresponding MPEG-2 data stream is shown, with major stream components identified. Sequence header, picture header and sequence end codes are inserted into the stream, as needed, to comply with the MPEG-2 and DVD specifications.

Presented below is architecture of a run-time algorithm per the invention, presenting frame creation, slice creation, and macro block manipulation in more detail.

---

Run Time Algorithms
This section describes the algorithmns used to create MPEG-2 streams for presentation to the decoder.
Add Image
The following algorithin is used by an application to select a foreground image for inclusion in the next subsequent P-frame display.
    MPEG_AddOverlay(imageAddress, imageSize, displayX, displayY, width, height)
        for each display line in the range displayY . . . (displayY + height)
            LineChanged[I] = TRUE;
            for each macroblock in the range displayX . . . (displayX + width)
                get slice size from first two bytes of image;
                store imageAddress + (start code size) into mgSlice structure;
                store imageSize - (start code size) into mgSlice structure;
                store maiLen into mgSlice structure (see note)
Notes The first two bytes of each foreground image are authored to contain the size of the slice, less the size of the start code.
This implementation provides two options: MAI length may be fixed at authoring time, or may be determined by decoding the VLC from the image. In the latter case, the fmdMaiLen algorithm is used to determine MAI length.
MAI Length Determination
The following algorithm is used to extract macroblock length from an image.
    findMaiLen(data)
        let V1 = data[0];
        let V2 = data[1];
        let V3 = data[2];
        let V = the least-significant two bits of V1 left-shifted by 8;
        let V = (V ior V2) left-shifted by 1;
        let V = V ior (V3 right shifted by 7);
        if V == macroblock escape code
            let V1 = data[2];
            let V2 = data[3];
            let V = the least-significant seven bits of V1 left-shifted by 4;
            let V = V ior (the most significant four bits of V2);
        search the macroblock VLC table addrinctab for a match on V; (see Note 1)
        if match found
            let maiLen = addrinctab[I].len;
            if macroblock escape code was detected
                let maiLen = maiLen + length of macroblock escape
sequence;
Notes:

The test for a match s (V >> (11-addrinctab[I].len) == addrinctab[I].code).
P-Frame Creation
The following algorithm creates a P-frame from Images previously submitted to the MPEG_AddOverlay algorithm.
    CreatePFrame( )
        let F be a working buffer to hold the P-frame data;
        let W be a working buffer to hold a newly assembled slice;
        copy the default sequence header data to F;
        append the default picture start code data to F;
        append the default extension start code data to F;
        for each display line I in the range 0 . . . Y_MAX
            if LineChanged[I] == FALSE // line did not change
                append Pnc_line to F; // slice with all null motion vectors -continued

```
                        else // Line did change
                                for each macroblock J in the range 0 . . . X_MAX
                                        append slice start code to F;
                                        replaceMacroblock(I, mgSlice[J][I]; // Build slice W
                                        append slice W to F;
                append sequence end code data to F;
Macroblock Replacement
The following algorithm is invoked by algorithm CreatePFrame above when a macroblock must
be inserted into the P-frame currently being created.
        ReplaceMacroblock(column, charSlice)
                                let W be the temporary output slice;
                                let WB be the current byte offset in the temporary output slice;
                                let WW be the current 16-bit word offset in the temporary output slice;
                                let tmpNrBits = 0;      // Number of output bits
                                let WB = WW = W;
                                copy 6 bits from charSlice data into W;
                                tempNrBits = 6;
                                // Compute new macroblock address increment
                                if column >=33 // Macroblock escape needed to accommodate addressing
                                        append 0x04 to W;
                                        column = column - 33;
                                        V = tmpNrBits + addrinctab[column].len + (macroblock escape code
length);
                                else
                                        V = tmpNrBits + addrinctab[column].len;
                                store addrinctab[column].code << (32-V) into WW; // New macroblock address
                                                                                  // increment
                                WB = WB + (V/8);
                                tmpNrBits = 8 - (V modulo-8);
                                skip original macroblock address increment in source image;
                                align source image pointer to next byte boundary;
                                append video data from image to W;
Frame Display
This algorithm implements the display of a video frame. The basic concept is to packetize the raw
video data, inserting MPEG-2 pack headers and Program Elementary Stream (PES) packet
headers at the beginning of each packet. The packet size used is 2048 bytes, corresponding to the
size of the user area within each DVD physical disc sector.
        DisplayFrame(mpegDisplayBuffer)
                                let F be a temporary buffer for frame assembly;
                                copy pack header to F;
                                append video packet header to F;
                                if sending I-frame
                                        append default PCI and DSI packs to F;
                                        reset temporal reference (frame number) to 0;
                                let secNr be current output sector number;
                                let nBytes be the total number of bytes to be displayed;
                                secNr = 0;
                                while nBytes > 0
                                        if secNr >= 1
                                                // This is done one time and applies to all sectors except sector
0
                                                clear PTS/DTS present flag in video packet header;
                                                set packet header length and stuffing data;
                                                set pack header size;
                                        // add sector
                                        append pack and packet information to F;
                                        append 2048 - (header size) bytes of video data to F;
                                        nBytes = nBytes - number of video data bytes copied to sector
                                        if secNr = 0
                                                search current sector buffer for picture header;
                                                if picture header found
                                                        set frame number in picture header;
                                                        increment frame number for use in next frame;
                                        secNr = secNr + 1;
```

In order to use MPEG graphics at a user station with limited processing power, it is necessary to pre-prepare (author) the graphics elements that will be used in the final interface. This authoring process must prepare the graphics elements themselves, and may, optionally, prepare the base images. In the preferred embodiment, base images are created as MPEG-2 I-frames, as described previously. This function is performed by direct coding of the image into an MPEG-2 I-frame. Graphics elements are created in two steps. An image with the desired graphic element is encoded as an I-frame and stored in a file. This I-frame is then used to extract the compressed macroblocks representing the desired image. The modification process strips header and trailer information, and stores macroblock address increment information in a macroblock header section, and the result is written to a graphics element file. For example, there is one graphics element file for each button displayed.

Accordingly, the invention enables graphics elements to be built, on the fly, at an end user site such as the home (in an entertainment environment) or a workstation (in a business environment), at a unit that decodes still image and full motion video images. Because these graphics elements are created in the same compressed digital format as the format of the video, decoding circuitry for video image and graphics signals is shared. Significantly, the user (or application) is enabled by the invention to develop dynamic graphics at the point of application using pre-compressed building blocks. The above description is illustrative and not restrictive. Many variations are possible and will become apparent to persons skilled in the art to which this invention pertains, upon review of this disclosure. The scope of the invention should therefore be determined not with reference only to the above description, but instead with reference to the appended claims, taking into account their full range of equivalents.

What is claimed is:

1. A method of processing video and graphics data for display comprising:

storing a plurality of graphics elements produced by graphics signals at least partly coded in a compressed video signal format;

obtaining a base video image formed by a video signal coded in a compressed video signal format the same as, or functionally compatible with, the compressed video signal format in which the graphics elements are coded;

selecting a graphics element from among said plurality of graphics elements;

combining the base video image and the selected graphics element coded in said compressed video signal format to produce combined base video and selected graphic image signals in the compressed video signal format; and decoding the combined base video and selected graphics element signals for display.

2. The method of claim 1, wherein said compressed video signal format conforms to the MPEG-2 standard.

3. The method of claim 2, including:

editing an MPEG-2 I-frame representing a base image by replacing a portion of the I-frame with data representing an MPEG-2 graphic to produce a modified I-frame.

4. The method of claim 2, including the steps of:

displaying a base image comprising an MPEG-2 I-frame;

creating a graphic image comprising at least one P-frame; and overlaying the I-frame with the display of at least one dynamically created P-frame.

5. The method of claim 3, including the steps of initially displaying an MPEG-2 I-frame representing a base image;

receiving character data from an input unit controlled by a user;

selecting MPEG-2 graphics element data representing the character data;

modifying the MPEG-2 graphics element data to enable an insertion of the data at a prescribed character position on the base image;

replacing a portion of the MPEG-2 I-frame with the graphics element data to produce a modified MPEG-2 I-frame; and supplying the modified I-frame to a display.

6. The method of claim 4, including encoding transparency macroblocks into regions of said at least one P-frame overlying uncovered regions of the base image.

7. The method of claim 2, including wrapping the MPEG-2 I-frames and P-frames in a DVD compliant video stream.

8. The method of claim 2, including authoring by coding an MPEG-2 I-frame representing a base image; and creating a graphics element by
      encoding and storing said desired graphics element as an MPEG-2 I-frame, and
      using said MPEG-2 I-frame representing said desired graphics element to extract compressed macroblocks representing the desired image.

9. A system for producing a video graphics display, comprising:

a first port for receiving a video stream in a compressed digital format;

a second port for receiving user selection input signals;

a memory for storing a plurality of graphic images in the form of graphics signals in a compressed digital format the same as, or functionally compatible with, that of the video stream;

a controller logically configured for creating a graphic image and producing a corresponding graphic image signal in response to an application signal in the video stream or a user selection input signal received at said second port; and a decoder connected to be responsive to the video stream and graphics signals for producing a composite output signal in said compressed digital format.

10. The system of claim 9, wherein said compressed digital format is the MPEG-2 standard.

11. The system of claim 10, wherein said memory stores MPEG-2 I-frame data, and said controller is further configured initially to send an I-frame to said decoder, and thereafter to build MPEG-2 P-frames from MPEG-2 graphics element data, depending on said application or user selection signal, for sending to said decoder.

12. The system of claim 11, wherein the graphics element data stored in said memory comprises selectable font macroblocks.

13. The system of claim 11, wherein said controller is further configured to display, initially, an MPEG-2 I-frame as a base image, and replace a portion of the image with data representing a graphic, to produce and display a modified I-frame.

14. The system of claim 11, wherein said controller is further configured to display initially an MPEG-2 I-frame as a base image, and overlay the base image with at least one MPEG-2 P-frame built from at least one graphic image.

15. The system of claim 14, wherein a portion of said at least one P-frame is encoded to represent transparency macroblocks in a region overlying a portion of the base image not covered by the graphic image.

16. The system of claim 11, wherein said MPEG-2 I-frame and P-frame data are wrapped by said controller in a DVD compliant video stream.

17. The system of claim 11, wherein the controller is further configured to receive application and graphics element data obtained at said first port.

* * * * *